(No Model.)

J. C. McCANDLISS.
WASHING MACHINE.

No. 356,257. Patented Jan. 18, 1887.

WITNESSES:
O. D. Mott
C. Sedgwick

INVENTOR:
J. C. McCandliss
BY Munn & Co.
ATTORNEYS.

UNITED STATES PATENT OFFICE.

JAMES CALVIN McCANDLISS, OF BARNARD, MISSOURI.

WASHING-MACHINE.

SPECIFICATION forming part of Letters Patent No. 356,257, dated January 18, 1887.

Application filed June 22, 1886. Serial No. 205,899. (No model.)

*To all whom it may concern:*

Be it known that I, JAMES CALVIN McCANDLISS, of Barnard, in the county of Nodaway and State of Missouri, have invented a new and Improved Washing-Machine, of which the following is a full, clear, and exact description.

My invention relates to an improvement in washing-machines, and has for its object to provide a machine wherein the scrubbers will have a rotary reciprocating motion in opposite directions at the same time, whereby the labor is reduced in washing and a speedy and effective operation attained.

The invention consists in the construction and combination of the several parts, as will be hereinafter fully set forth, and pointed out in the claim.

Reference is to be had to the accompanying drawings, forming a part of this specification, in which similar letters of reference indicate corresponding parts in both the figures.

Figure 1:
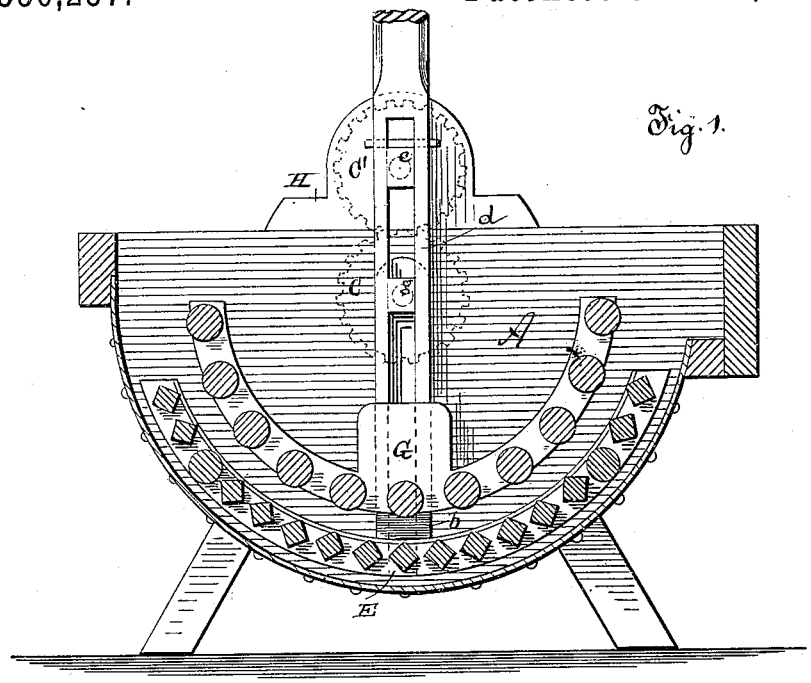
Figure 2:
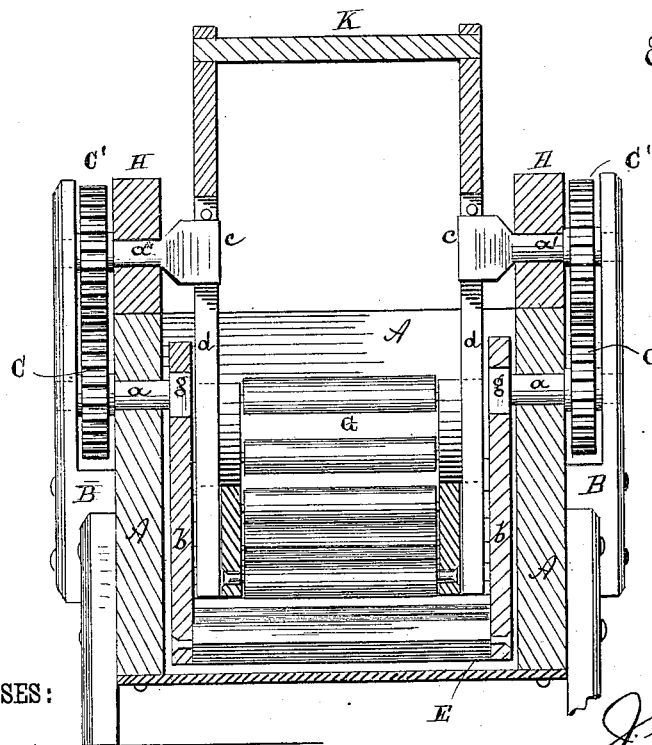

Figure 1 is a longitudinal section of my washing-machine, and Fig. 2 a vertical section thereof.

A designates a semicircular box supported upon suitable legs, and usually constructed with wooden sides and metallic bottom.

B B are brackets, fastened one to each side of the machine, to form the outer bearings for axles $a\ a'$, upon which spur-wheels C C' are keyed, the one below the other, in the same vertical plane, sufficiently close to admit of meshing between the brackets B and the sides of the box A.

The axles $a$, carrying the spur-wheels C, have their inner bearings in the sides of the box itself, and extending through the box and formed with square heads $g$, adapted to fit and be securely fastened in similar openings in the arms $b\ b$ of the lower semicircular rubber, E.

Blocks H, forming a central extension of the sides of the box A, constitute the bearings for the inner ends of the axles $a'$, carrying the spur-wheels C', and which, extending through the blocks, are formed with the enlarged heads $c$, adapted to fit and travel in the slotted arms $d\ d$ of the upper semicircular rubber, G. The slotted arms $d\ d$ of the upper rubber, G, are connected by a bar at their upper ends, forming the handle K, by which the machine is operated. The slots in the arms $d\ d$ extend their entire length, allowing the withdrawal of the rubber G from the box to facilitate putting in or taking out clothes.

I usually place a pin through the side of the slotted arms $d\ d$, to form a bearing for the arms $d\ d$ on the axle-head $c$.

The semicircular rubbers G E are suspended by means of their arms $d$ and $b$ in the same vertical plane, the axis of the one being directly below that of the other, so that when the machine is operated by means of the handle K the rubbers, though moving in opposite directions, have at the same time a rotary reciprocating motion.

In the operation of my machine the rubber G is slid up out of the box by means of its slotted arms $d\ d$, and the clothes placed for washing. The rubber is then replaced by engaging the slots $d\ d$ with the axle-heads $c$ and slid down to a bearing therein. As the handle upon the upper rubber, G, is drawn forward its slotted arms $d\ d$ cause the axle-heads $c$ in engagement with them to take a quarter-turn to the front. This motion causes the spur-wheels C', keyed upon the opposite ends of the axles $a'$, to simultaneously engage the gear-wheels C immediately under them and transmit an opposite motion through the axles $a$ and their heads $g$ to the arms $b$, carrying the lower semicircular rubber, E. Therefore, if the semicircular rubbers are parallel and their arms in the same vertical plane when started, as seen in Fig. 1, the one pull of the handle toward the operator will cause the rubbers to pass the one under the other to about one-half their length, the upper rubber, G, passing to the front of the machine and the lower one to the rear, or toward the operator. When the handle is pushed from the operator, the reverse position is found. During the entire operation of washing in my machine the rubbers never entirely pass one another, the one being constantly covered by the other at some point.

I usually construct the knuckles of the upper semicircular rubber of my machine of round or octagonal slats of hard wood pivoted to the side frames, while the knuckles of the lower rubber I usually make square and fasten them rigidly within the frame with their angular surface uppermost; but the knuckles in the lower rubber may be of octagonal shape and pivoted the same as in the upper rubber.

Having thus fully described my invention, I claim as new and desire to secure by Letters Patent—

In a washing-machine, the combination, with a semicircular body, A, having side brackets, B, of axles $a$, carrying the spur-wheels C at one end and secured to the arms $b$ of the rubber E by the head $g$ at the other, and the axles $a'$, carrying the spur-wheels C' at one end and provided with the enlarged head $c$ at the other, adapted to work in the slotted arms $d$ of the upper rubber, G, the whole to be operated from the handle K, substantially in the manner and for the purpose herein set forth.

JAMES CALVIN McCANDLISS.

Witnesses:
PRESTON DAVIS,
WILLIAM T. WHITEFORD.